INVENTOR.
HERBERT E. TRACY
BY John O. Evans, Jr.
ATTORNEY

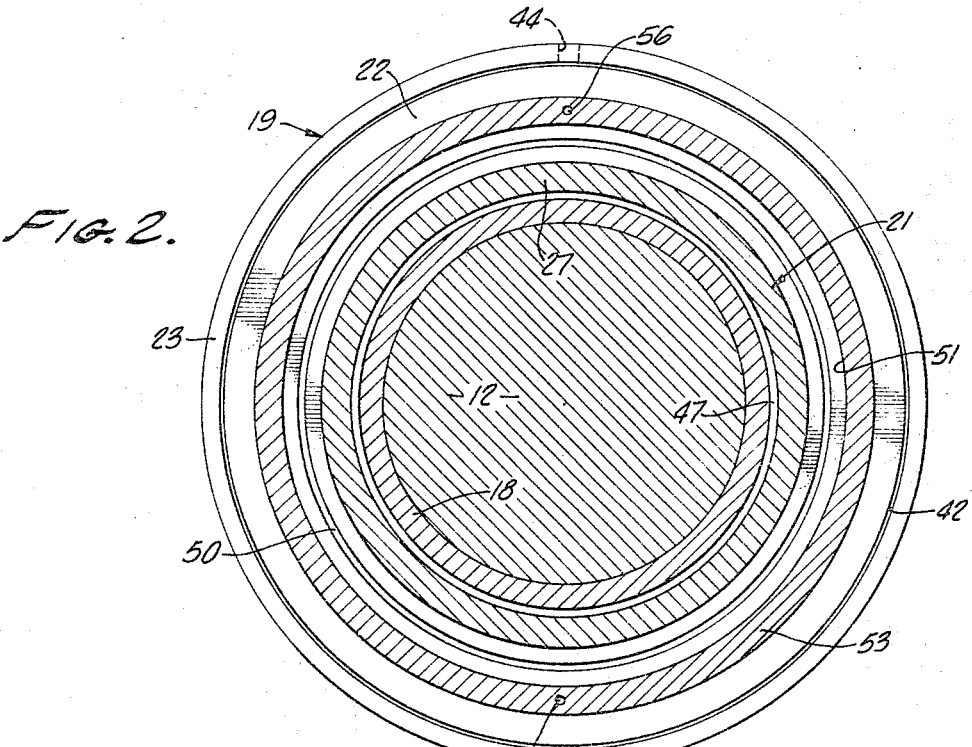
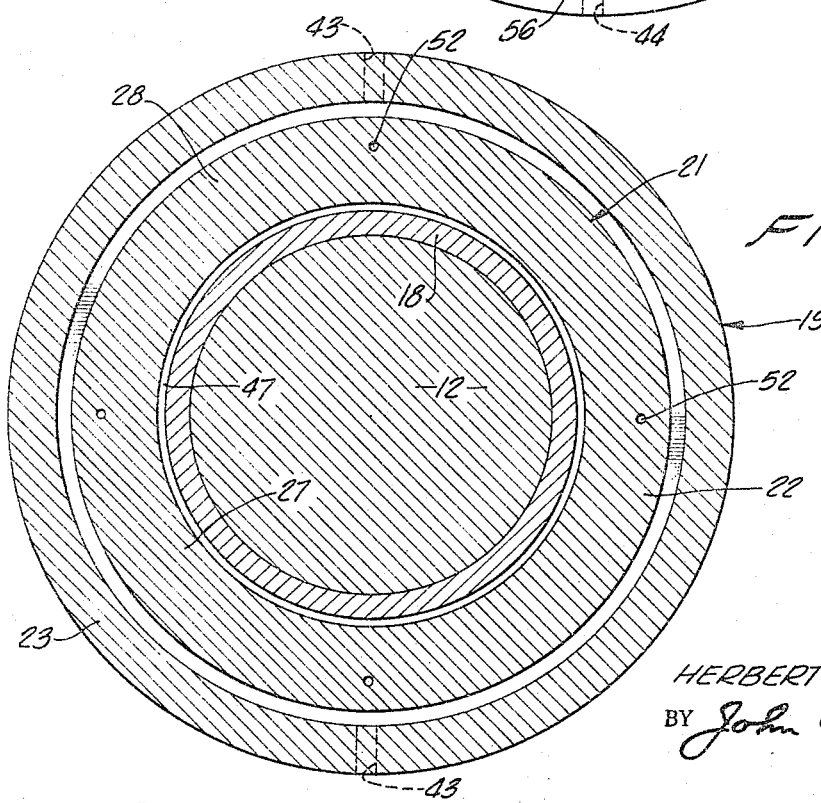

May 9, 1967 — H. E. TRACY — 3,318,604
SELF-ADJUSTING MECHANICAL SEAL WITH BELLOWS CONTROL
Filed Dec. 31, 1964 — 4 Sheets-Sheet 3

INVENTOR.
HERBERT E. TRACY
BY John O. Evans, Jr.
ATTORNEY

May 9, 1967 H. E. TRACY 3,318,604
SELF-ADJUSTING MECHANICAL SEAL WITH BELLOWS CONTROL
Filed Dec. 31, 1964 4 Sheets-Sheet 4
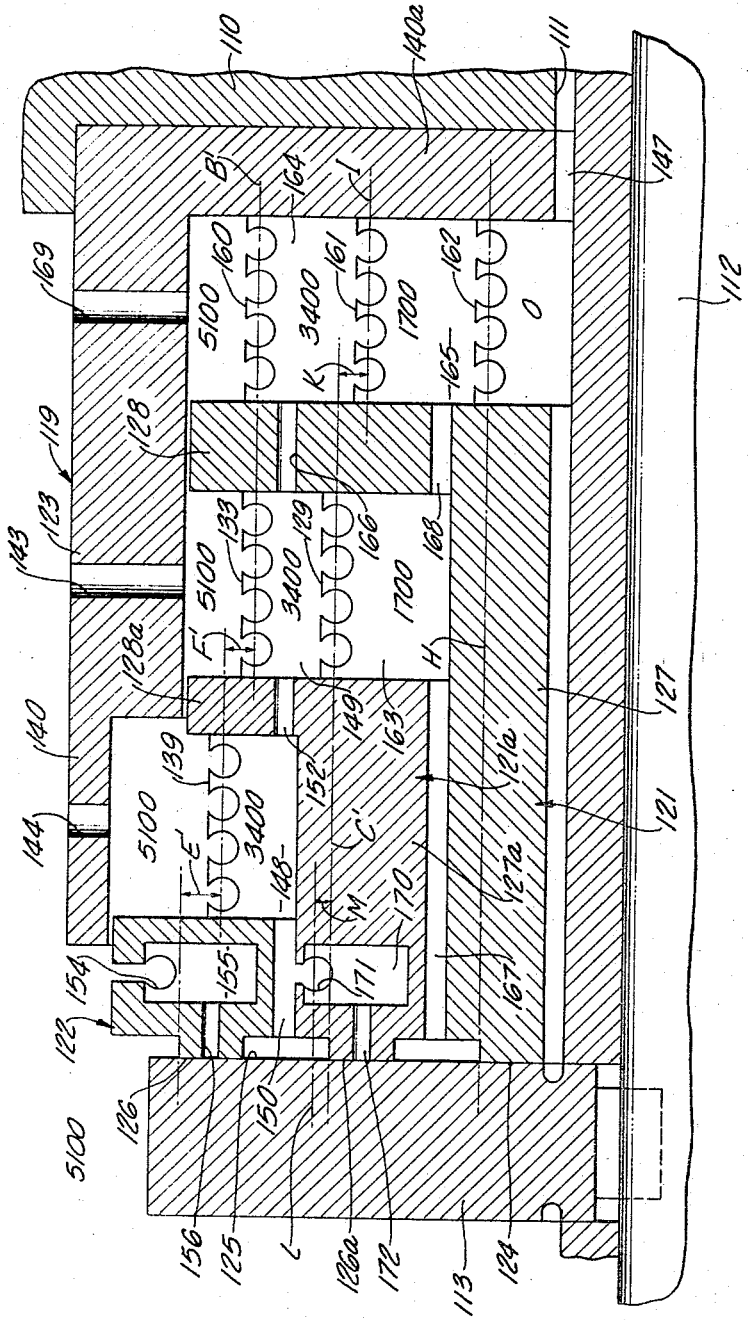
INVENTOR.
HERBERT E. TRACY
BY John O. Evans, Jr.
ATTORNEY United States Patent Office 3,318,604
Patented May 9, 1967

3,318,604
SELF-ADJUSTING MECHANICAL SEAL WITH BELLOWS CONTROL
Herbert E. Tracy, Alhambra, Calif., assignor to Borg-Warner Corporation, Chicago, Ill., a corporation of Illinois
Filed Dec. 31, 1964, Ser. No. 422,831
11 Claims. (Cl. 277—27)

This invention relates to mechanical seals, and more particularly to a self-adjusting mechanical seal with bellows control.

Mechanical seals, or rotary seals as they are sometimes called, usually comprise parts, such as a ring, held stationary with respect to a housing, and parts, such as another ring, fixed for rotation on or with a shaft which rotates in the housing. Each sealing part, sometimes called sealing elements or means, may comprise one or more rings, and each sealing part is provided with a face which opposes a face of another sealing means and is arranged so that, in response to either fluid pressure or spring pressure, or both, there is a sealing relationship between the opposed faces (sometimes called sealing faces) to form a seal to prevent leakage out along the shaft. This sealing relationship, however, does not mean that the opposing faces are necessarily in direct contacting relationship with each other, especially over their entire faces, but means that a small lubricating film of fluid is permitted between these sealing faces to prevent or reduce (in the case of metal rings) direct metal-to-metal contact therebetween. This lubricating film is usually made up of the fluid being sealed and reduces wear and/or seizure of the sealing faces. As a matter of fact, this leakage of fluid past the sealing faces is necessary to the proper operation of mechanical seals; and such seals are designed to reduce this leakage to a minimum, yet not prevent it entirely, during normal operation of the seal, so that a film of fluid is maintained for lubricating and for its cooling effect on opposed sealing faces.

In my United States Patent No. 2,930,636, issued March 29, 1960, for "Self-Adjusting Seal," assigned to the assignee of the present application, I have shown and described a self-adjusting seal for sealing high pressures, for example 1,500 p.s.i. and above, that provides two or more concentric seal rings adjustably cooperative with an opposed seal ring in which the high pressure inside the housing is dropped to a low pressure outside of the housing across the seal rings in stages. In the illustrative forms of the seal shown in the drawings of my prior patent, the full differential pressure across the end of the entire mechanical seal is gasketed between one of the concentric seal rings and the shaft. Also, a spring member or members are used to urge the rings into sealing relationship, and interlocking means are provided for preventing relative movement between concentric rings and the shaft.

The present invention is an improvement over the self-adjusting seal shown and described in my prior patent; the nature and advantages of the self-adjusting seal of the present invention will be pointed out more particularly hereinafter. However, in the present seal, it is not necessary to use separate springs or interlocking devices for the concentric rings, and the housing pressure is dropped in successive stages across the seal elements to the pressure external to the shaft housing; at no point is full differential pressure applied across a concentric sealing ring or across elements sealing the concentric rings to the housing or shaft.

The self-adjusting seal of the present invention may incorporate features similar to those disclosed in United States patent application, Serial No. 347,719, filed February 27, 1964, by Winfred J. Wiese, for "Mechanical Seal With Flow Control," which application is assigned to the assignee of the present application. If such features are incorporated in the self-adjusting seal of this invention, they function to enable the seal to quickly achieve a balanced condition following a sudden increase in housing pressure as when apparatus embodying the seal is started up.

It is, therefore, an object of the invention to provide a self-adjusting mechanical seal, wherein bellows units are used to seal concentric rings to each other and to a member which supports them, whereby the seal resists great pressure differentials with correspondingly smaller differential pressures existing across each stage of the seal.

Another object of the invention is to provide a seal of the foregoing type wherein the bellows units act as springs to exert initial sealing pressure, and also serve as elements to prevent relative rotation of the plurality of seal rings forming one of the sealing members, thereby eliminating the use of separate springs and interlocking elements.

A further object of the invention is to provide such a seal wherein the bellows units are required to withstand but a fraction of the total pressure differential across the seal.

Yet another object is to provide in such a seal means for quickly balancing the pressures across the sealing members in response to sudden pressure changes of relatively great magnitude across the entire seal.

A further object is to provide, in such a seal, means for automatically adjusting the rings of the seal to compensate for changes in leakage rates across the sealing faces.

Still another object of the invention is to provide a mechanical seal that will withstand high pressure differentials.

Another object is to provide a seal of the foregoing character that is relatively simple to make, that is reliable in operation, and that can be used for sealing off high pressures for long periods of continuous operation.

The foregoing, and other aims, objects and advantages of the invention, as will appear hereinafter, are realized in a mechanical seal including: cooperating fixed and rotary sealing elements, one of which elements has a plurality of generally concentric seal rings having sealing faces opposed to a radially extended sealing face of the other element. The concentric seal rings of the one element are provided with bellows units that seal each of them either to another ring or to the member which carries them. The mechanical seals of the invention may also include means for flexing one or more of the concentric seal rings in response to fluid pressure changes acting on portions of the ring.

The invention will be described with greater particularity in the following detailed description of the accompanying drawings in which:

FIG. 2 is a sectional view, on a reduced scale, taken on the line 2—2 of FIG. 1;

FIG. 3 is a sectional view taken on the line 3—3 of FIG. 1, reduced to the same scale as FIG. 2;

FIG. 6 is an axial, half-sectional, schematic view of another form of seal in accordance with the invention.

In the several figures of the drawings, like reference numerals or characters denote like parts.

Figure 1:
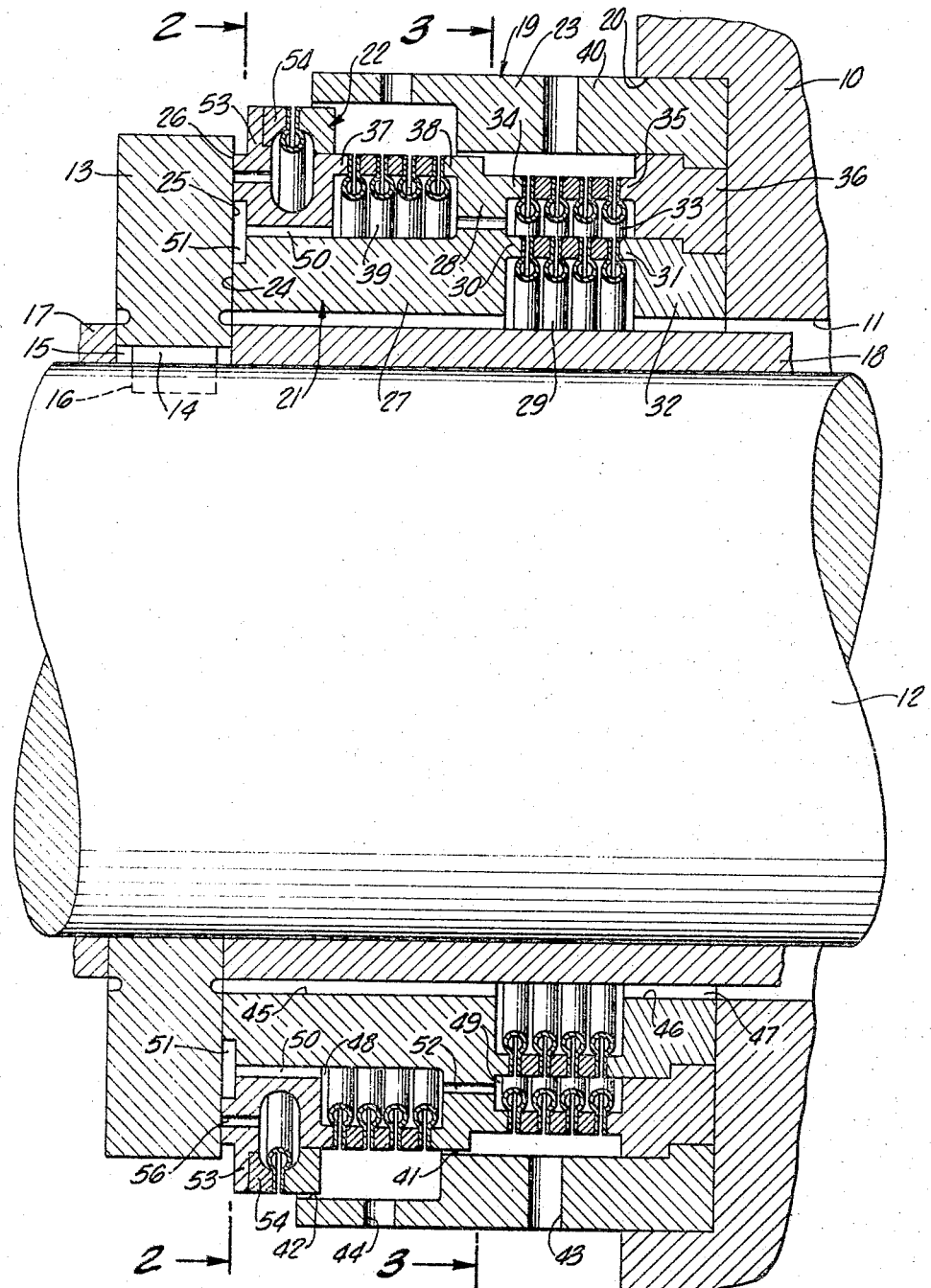
FIG. 1 is an axial, sectional view of one form of mechanical seal in accordance with the invention, the seal being associated with a shaft rotatable in a housing opening.

Referring to the drawings, and particularly to FIGS.

1, 2 and 3 thereof, the seal arrangement shown has a housing wall 10 having a shaft opening 11 extending therethrough. The housing wall may enclose, for example, a pump (not shown) or other pressure producing device that is driven by a shaft 12 passing through the opening in the housing wall from the outside of the housing to the inside. This shaft is mounted for rotation by means (not shown). When the pump or other device is rotated by the shaft, high pressure is created within the housing wall 10, to the left of the wall as shown in FIG. 1, or, the housing pressure may be produced in other ways. Atmospheric pressure, or other lower pressure, exists on the right-hand side of the housing wall, as seen in FIG. 1. The fluid inside the housing is usually a liquid having the ability to lubricate the sealing faces of the mechanical seal.

The mechanical seal of the invention is operatively located between the housing wall 10 and the shaft 12 to prevent flow of fluid from inside the housing through the shaft opening 11 to the exterior. The seal consists essentially of two elements. One of these is a rotary seal ring 13 fitted to the shaft and keyed to the shaft by a key 14 fitted in a slot 15 in the ring and received in an opposing recess 16 formed in the periphery of the shaft. The rotary ring is prevented from shifting axially along the shaft by sleeves 17 and 18 that rotate with the shaft and abut the sides of the rotary ring. These sleeves are fixed to and rotate with the shaft.

The other member of the seal is a stationary element designated by the general reference numeral 19. The stationary sealing element is fixedly mounted in a bore 20 formed on the inner side of the housing wall 10.

The stationary sealing element has an inner seal ring 21 and an outer seal ring 22 contained within a case 23. The inner seal ring has an annular sealing face 24 abutting a portion of an opposed, radially extended, sealing face 25 of the rotary seal ring 13. Similarly, the outer seal ring 22 has a sealing face 26 opposed to, and sealingly cooperating with, another portion of the radially extended sealing face of the rotary seal ring.

The inner seal ring 21 has an axially extending cylindrical portion 27 and an integral, radially extending flange portion 28. A bellows unit 29 is welded at one end to an axially projecting annular portion 30 formed on the back of the inner seal ring. The other end of the bellows unit 29 is welded to an annular projection 31 formed on the backing ring 32 that comprises a portion of the case 23.

Another bellows unit 33, of somewhat larger diameter than the bellows unit 29, surrounds the latter and is welded between an annular projection 34 on the inner seal ring and an opposed annular projection 35 on another backing ring 36, which also forms a portion of the case 23.

The outer seal ring 22 has an annular projection 37 disposed opposite to still another annular projection 38 on the front of the flange 28 of the inner seal ring. Between these two projections is welded a third bellows unit 39 of somewhat larger diameter than the bellows unit 33.

The case 23 has a generally axially extended cylindrical portion 40 that encircles nearly completely the inner and outer seal rings and the bellows units thus far described. This cylindrical case portion 40 has an inwardly facing annular shoulder 41 that encircles the outer periphery of the flange 28 and is spaced slightly from the periphery to prevent any substantial lateral movement of the inner seal ring. Another shoulder 42 on the interior of the cylindrical case portion 40 surrounds a section of the outer periphery of the outer seal ring 22 to similarly prevent any substantial lateral movement of the outer seal ring.

Ports 43 and 44 are provided in the cylindrical case portion to place the radially outer sides of the bellows units 33 and 39 in fluid communication with the interior of the housing.

The inner periphery 45 of the inner seal ring and the inner periphery 46 of the backing ring 32, together with the radially inner face of the bellows unit 29, are spaced outwardly from the shaft sleeve 18 to provide an annular channel 47 that places the inner edge of the sealing face 24 and the inner face of the bellows unit 29 in fluid communication with each other and with the atmosphere through the shaft opening 11.

Thus, there are provided two chambers 48 and 49. Chamber 48 communicates through an annular space 50 between the inner and outer seal rings with an annular space 51 between sealing faces 24 and 26 of the inner and outer seal rings. This chamber 48 also communicates with the chamber 49 through one or more holes 52 (see FIG. 3) bored through the radial flange 28 of the inner seal ring.

The outer seal ring 22 has a main body portion 53 and a single element bellows unit construction 54 welded to it, the body portion and the bellows structure being arranged to provide an internal chamber 55 in the ring. This internal chamber is placed in fluid communication with the sealing face 26 through one or more holes 56 (see FIG. 2) bored through the body portion of the outer seal ring.

In making the stationary element of the seal of FIG. 1, it will be understood that the several components may be welded together at the joints to render them pressure-tight. For example, the components of the case may be welded at the joints, and the case may be welded to the housing wall 10. The parts of the bellows units may be welded at their joints. Other modes of fabrication may be employed, if desired.

Figure 4:
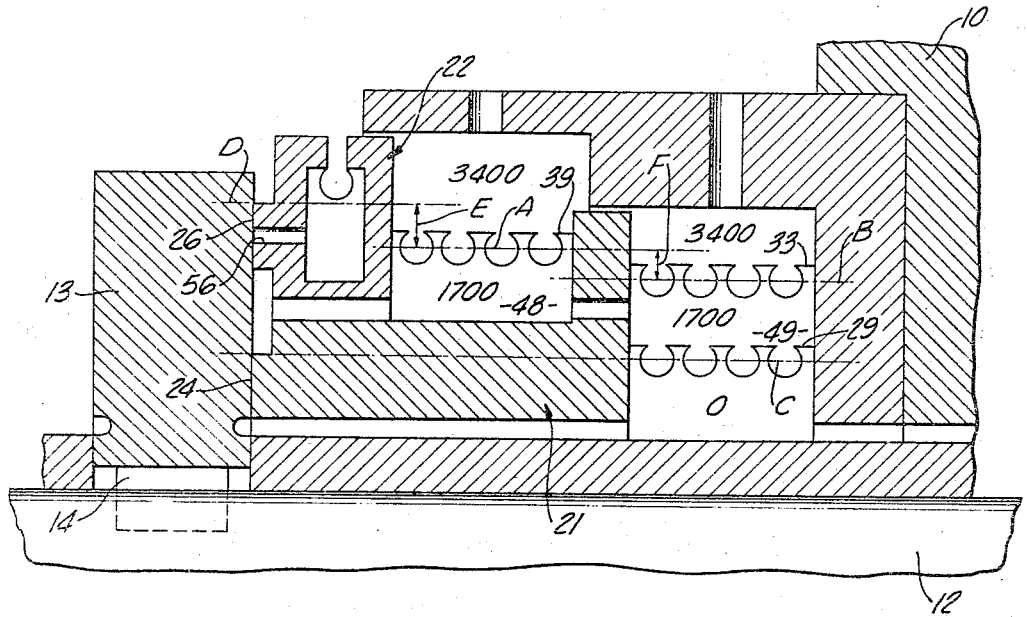
FIG. 4 is an axial, half-sectional, schematic view of the mechanical seal shown in FIG. 1.

Reference is now made to FIG. 4 for a further description of the relationships among the seal rings and the bellows units. For bellows units, in general, the mean circumference of the bellows unit determines the effective annular area over which differential fluid pressure across the bellows acts to produce a force longitudinally of the bellows unit. In FIG. 4, the construction line A marks the mean circumference of the bellows unit 39. The mean circumference of the bellows unit 33 is denoted by the construction line B; and the mean circumference of the bellows unit 29 is marked by the construction line C. The circumference of the outer edge of sealing face 26 of the outer seal ring is indicated by the construction line D.

Bellows unit 39 is so constructed that its mean radius is somewhat less than the radius of the outer edge of sealing face 26. The annular area on the back of the outer seal ring 22 between these radii is indicated by the double-headed arrow E. Thus, for all differential pressures existing across the bellows unit 39, where the pressure outside the bellows is higher than that inside the chamber 48, a force equal to the differential pressure applied over the area denoted by the double-headed arrow E will tend to move the outer seal ring 22 to the left, as seen in FIG. 4. Under equilibrium conditions, this force is opposed by an equal and opposite force produced by the minute film of liquid between the sealing face 26 and the cooperating sealing face of the opposed rotary seal ring 13. This counter force is a function of the pressure drop across the seal face 26. Design practice has shown that where the area indicated by the double-headed arrow E is from about 50% to about 85% of the area of the sealing face 26, good operation of the seal will result.

The mean radius of bellows unit 33 is somewhat less than the mean radius of bellows unit 39 and, where there is a pressure drop across the bellows unit 33, the force tending to move the inner seal ring 21 to the left is equal to the pressure drop acting over the area denoted by the double-headed arrow F. Note that the bellows unit 29 has a mean radius equal to the radius of the outer edge of the seal face 24. Hence, for any pressure differential across this bellows unit, no force is exerted on the inner seal ring.

Under equilibrium conditions, the force acting on the area F is opposed by an equal and opposite force produced by the film of liquid between the sealing face 24 and the opposed sealing face of the rotary seal ring 13. In the case of the inner seal ring, the area indicated by the double-headed arow F may be from about 50% to about 80% of the area of the sealing face 24 for satisfactory functioning.

The operation of the seal shown in FIG. 4 will now be described. Assuming, for example, that the pressure inside the housing 10 is 3,400 p.s.i.g. and that the pressure outside the housing is 0 p.s.i.g., the pressure drop across the entire seal is 3,400 p.s.i. When operating balance is achieved, the pressure in the space between the sealing faces 24 and 26, and consequently in the chambers 48 and 49, will be the mean pressure of 1,700 p.s.i. Thus, the pressure drop across the sealing face 26 of the outer ring and across the bellows units 39 and 33 is 1,700 p.s.i. Also, the pressure drop across the sealing face 24 and across the bellows unit 29 is 1,700 p.s.i. It will be understood that, if the leakage rate of fluid across sealing face 26 is the same as the leakage rate across the face 24, the pressures shown on the drawing will remain constant, and the seal will maintain balance.

On the one hand, if the outer sealing face 26 leaks at a greater rate than the inner sealing face 24, pressure will increase in the space between the inner and outer seal rings and in the chambers communicating therewith. If this pressure should rise, for example, to 1,800 p.s.i.g., the differential pressure across the outer sealing face 26 and the bellows unit 39 would be reduced to 1,600 p.s.i. But since the same pressure differential of 1,600 p.s.i. would obtain across both the seal face 26 and the bellows unit 39, the outer seal ring would maintain its spacing from the rotary seal ring 13, and the leakage rate across the sealing face 26 would be the same as it was when the seal was balanced at a pressure of 1,700 p.s.i.g. in the chamber 48. Also, the differential pressure across the bellows unit 33 has decreased to 1,600 p.s.i., which decreases the force acting on the area F. Moreover, the pressure drop across the seal face of the inner sealing ring has increased to 1,800 p.s.i. The force created by this increased pressure differential, together with the reduced force on the area F, moves the inner seal 21 to the right to open the gap between the sealing face 24 and the opposed rotary seal ring 13 to increase the leakage rate across the sealing face 24 and re-establish the original pressure balance.

Under these same conditions, the pressure drop across the sealing face 24 and across the bellows unit 29 of the inner seal ring would be increased to 1,800 p.s.i. But because this bellows is aligned circumferentially with the outer edge of the sealing face 24, the bellows exerts no force on the inner sealing ring, regardless of the pressure drop across it.

On the other hand, if the inner seal ring should leak across its sealing face 24 at a greater rate than the outer seal ring leaks across its sealing face 26, the pressure between the rings would drop. If, for example, this pressure falls to 1,600 p.s.i.g., the pressure differential across both the sealing face 26 of the outer seal ring and across the bellows unit 39 would become 1,800 p.s.i.; and the pressure differential across the sealing face 24 of the inner seal ring and across the bellows unit 29 would drop to 1,600 p.s.i. Under these assumed conditions, the outer seal ring, having the same pressure drop across both its seal face 26 and its associated bellows unit 39, would maintain its position relative to the rotary seal ring 13. However, the force acting on the area denoted by the double-headed arrow F would increase due to the increased pressure drop across the bellows 33. And the counter-force acting on the seal face 24 would decrease because of the decreased pressure differential across the sealing face 24. Both of these changes in forces act upon the inner seal ring 21 in a direction to move the ring toward the rotary seal ring 13, thereby to narrow the gap between the sealing face 24 and the rotary seal ring 13 and decrease the rate of fluid flow across the sealing face 24. Thereupon, the pressure between the inner and outer sealing rings will rise until it reaches a value of 1,700 p.s.i., and balance is restored.

Figure 5:
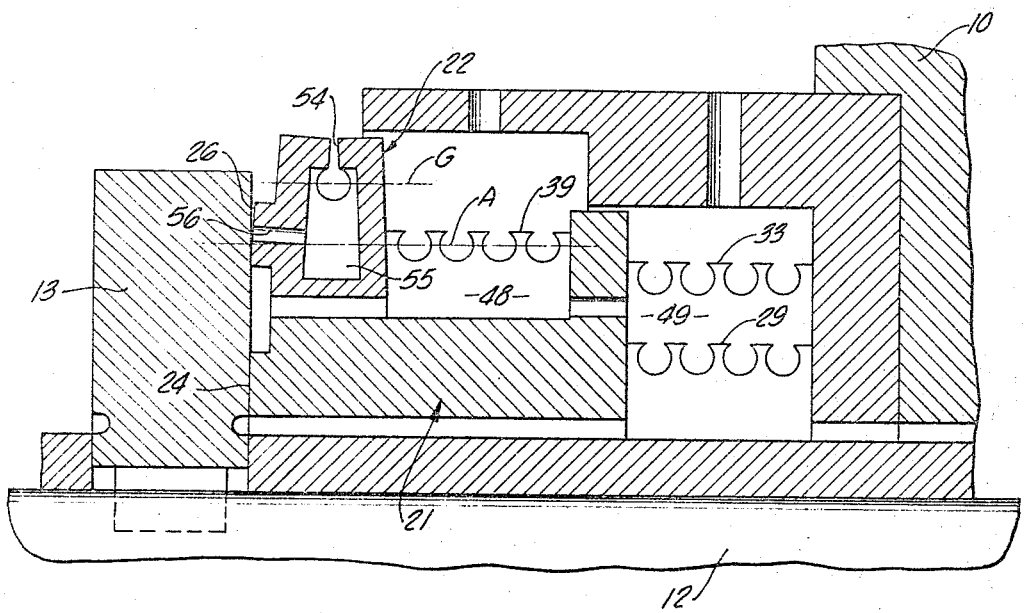
FIG. 5 is a view similar to FIG. 4 but showing certain parts in other operative positions.

There will now be described, with particular reference to FIG. 5, what occurs when, for example, the pressure inside the housing 10 is suddenly increased, as when the apparatus is started up. On start-up, the pressure inside the housing may increase very quickly from 0, to say 3,400 p.s.i.g., suddenly imposing a pressure drop of this value across the entire seal. Initially, the pressure between the inner and outerseal rings 21 and 22, and in the chambers 48 and 49, is 0. It is desired to increase the pressure in these zones as quickly as possible to the operating value, say, 1,700 p.s.i.g. To this end, the outer seal ring 22 is rendered slightly flexible by the provision of the annular chamber 55 and the bellows unit 54 at the outer periphery of the ring. The mean radius of the bellows element of the unit 54 is indicated by the construction line G. This mean radius is greater than the mean radius indicated by the construction line A of the bellows unit 39. Pressures inside the housing acting on front and back surfaces of the outer seal ring 22 between the construction lines A and G tend to squeeze the sides of the outer ring together, as shown, greatly exaggerated, in FIG. 5. On start-up of the apparatus, the pressure in the annular chamber 55 is 0. When the sides of the outer ring are flexed toward each other, the sealing face 26 of the outer ring is canted away from the rotary seal ring 13, as shown in FIG. 5, to allow fluid within the housing to move quickly into the space between the outer and inner seal rings and into chambers 48 and 49. Liquid also moves through the holes 56 into the annular chamber 55 in the outer seal ring. As pressure increases in the space between the inner and outer seal rings, liquid begins to leak across the sealing face 24 of the inner seal ring. When a balanced condition has been reached, the pressure between the seal rings will be approximately the mean of the pressures inside and outside the housing. Also, with the hole 56 located approximately on the mean radius of the seal face 26, the pressure in the annular chamber 55 will be about halfway between the pressure within the housing and the pressure between the inner and outer seal rings. Under balanced conditions, the side walls of the outer seal ring will flex back to assume positions somewhere between those shown in FIG. 5 and those shown in FIG. 4. The construction of the outer seal ring and its method of operation on start-up of the apparatus enables the seal to reach balance in a relatively short time and prevents subjecting the bellows units 39 and 33 to full housing pressure for more than a brief period of time.

Reverting to FIG. 1, the bellows units 39, 33 and 29 are under slight axial compression when there is no pressure differential across the seal as a whole. Thus, they act as springs to urge the sealing faces 24 and 26 into contact with the rotary seal ring 13 when the apparatus is at rest. It will also be seen that the bellows unit 39 prevents relative rotation of the outer seal ring with respect to the inner seal ring. Similarly, the bellows units 29 and 33 prevent relative rotation of the inner seal ring with respect to the case 19. No separate interlocking means are needed to prevent relative rotation of the inner and outer seal rings with respect to each other and with respect to the case.

Another form of self-adjusting mechanical seal in accordance with the invention is shown schematically in FIG. 6. Referring to FIG. 6, the half-sectional view shows a seal arrangement having a shaft 112 extending through a shaft opening 111 in a housing 110 and mounted for rotation in the opening. The shaft carries a rotary seal ring 113, forming one element of the seal. A complementary, stationary seal element, designated by the general reference number 119 has a case 123 with a cylindrical portion 140 and a flange portion 140a, which may be made up of interfitting backing rings, as in the form of the invention as shown in FIGS. 1 to 3. Generally within the cylindrical portion of the case are mounted three concentric seal rings: an inner seal ring 121, an outer seal ring 122, and an intermediate seal ring 121a. These seal rings have, respectively, sealing faces 124, 126 and 126a, the sealing faces being opposed in sealing relationship to the sealing face 125 of the rotary seal ring. The intermediate seal ring has a cylindrical portion 127a and an integral, radial flange portion 128a. The inner seal ring also has a cylindrical portion 127 and an integral flange portion 128. A bellows unit 139 is welded between the outer seal ring 122 and flange 128a of the intermediate seal ring to provide with these rings a chamber 148 that communicates through the annular space 150 with the space between the sealing faces 126 and 126a.

Two bellows units 133 and 129 are welded between the back of the intermediate seal ring and the flange portion of the inner seal ring. Three bellows units, 160, 161 and 162, are welded between the back of the inner seal ring and the flange portion 140a of the case.

Bellows units 133 and 129, together with portions of the intermediate and inner seal rings, form chambers 149 and 163. Bellows units 160, 161 and 162 form other chambers 164 and 165. Chamber 149 communicates with chamber 148 through a hole or holes 152 in the flange of the intermediate seal ring; and chamber 164 communicates with chamber 149 through a hole or holes 166 bored through the flange of the inner seal ring.

The annular space 167 between the inner and intermediate seal rings places the chamber 163 in fluid communication with the space between the sealing faces 126a and 124. A hole or holes 168 bore through the flange of the inner seal ring intercommunicates the chambers 163 and 165.

The inner edge of the sealing face 124 is exposed to pressure outside the housing through the annular channel 147, and the inner surface of the bellows 162 also is exposed to atmospheric pressure through this annular channel.

Ports 144, 143 and 169 expose the outer surfaces of bellows units 139, 133 and 160 to housing pressure.

The outer seal ring 122 is made like its counterpart 22 of FIGS. 4 and 5 and has a bellows unit structure 154, an annular internal chamber 155, and a hole or holes 156 that communicates the chamber with the sealing face 126.

A somewhat similar arrangement is provided in the intermediate seal ring for quickly passing fluid from the space between the outer and intermediate seal rings to the space between the intermediate and inner seal rings when the apparatus is first started. This arrangement includes an internal annular chamber 170 and a bellows element 171, together with one or more holes 172 that admit fluid from the sealing face 126a into the chamber 170.

Insofar as concerns maintaining a balanced condition, the outer and intermediate seal rings of the seal of FIG. 6 function like the corresponding seal rings 22 and 21 of FIG. 4, as explained in detail hereinbefore. Therefore, it will be unnecessary to repeat the explanation here in full. In brief, the outer seal ring 122 responds to the differential pressures existing across the bellows unit 139 as applied to the area E′, and across the seal face 126. The intermediate seal ring 121a is responsive to differential pressure existing across the bellows unit 133 as applied to the area F′, and across the seal face 126a.

Regarding the bellows elements between the inner seal ring 121 and the case flange 140a, the mean circumference of the bellows unit 160 is axially aligned with the mean circumference of the bellows unit 133 along the construction line B′. Owing to such alignment and to the fact that differential pressures across the two bellows units is the same, the bellows units impose no axial forces on the inner seal ring.

The mean circumference of the bellows unit 162 is axially aligned with the outer circumference of the sealing face 124 along the construction line H. Since the pressure differentials across the bellows unit 162 and the sealing face 124 are always equal to each other, the bellows unit 162 exerts no axial force on the inner seal ring.

The bellows unit 161 has its mean circumference I spaced radially inward from the mean circumference C′ of the bellows unit 129. This spacing marks an area on the inner seal ring, which area is indicated by the double-headed arrow K. Upon this area, the differential pressure across the bellows unit 161 acts to urge the inner seal ring toward the left, as seen in FIG. 6. A force opposed to this force is produced by the liquid film between the sealing face 124 of the inner seal ring and the complementary sealing face of the rotary seal ring 113.

In operation, if the seal face 126a of the intermediate seal ring should leak at a higher rate than the seal face 124 of the inner seal ring, the pressure in the chamber 163 between these rings would increase. Let it be assumed that this pressure rises from an equilibrium pressure of 1,700 p.s.i.g. to 1,800 p.s.i.g., with the pressure between the outer and intermediate seal rings remaining constant at 3,400 p.s.i.g. This change would have no effect upon the intermediate seal ring because of the alignment of the bellows unit 129 with the outer circumference of the seal face 126a, as shown by the construction line C′. However, the pressure differential across the bellows unit 161 would be reduced from 1,700 p.s.i. to 1,600 p.s.i. Also, the pressure drop across the sealing face 124 would be increased from 1,700 p.s.i. to 1,800 p.s.i. Both of these changes would tend to move the inner seal ring axially to the right, as seen in FIG. 6, thereby opening the gap between the sealing face 124 and the seal ring 113 to increase the flow rate across the sealing face 124 to restore the pressure between the intermediate and the inner seal rings to the desired equilibrium pressure of 1,700 p.s.i.

Conversely, if the sealing face 124 leaks at a higher rate than the sealing face 126a, pressure between the inner and intermediate seal rings would decrease. If this pressure should fall, for example, to 1,600 p.s.i.g., the pressure differential across the bellows unit 161 would go to 1,800 p.s.i. This increased pressure differential acting on the inner seal ring over the area K would tend to move the seal ring to the left, as seen in FIG. 6. Moreover, the pressure drop across the seal face 124, under these conditions, has fallen to 1,600 p.s.i., thereby reducing the pressure acting on the face 124 and assisting the force on the area K to move the inner seal ring to the left. Thus, the inner seal ring moves in a direction to set the sealing face 124 more firmly toward the rotary seal ring 113 to reduce the rate of fluid flow across the sealing face and to restore the pressure between the inner and intermediate seal rings to its equilibrium value of 1,700 p.s.i.

With reference to the means associated with the intermediate seal ring for quickly passing fluid from the space between the outer and intermediate seal rings to the space between the intermediate and inner seal rings when the apparatus is started, it will be seen that the mean circumference of the bellows element 171 lies along the construction line L. This mean circumference is greater than the outer circumference of the sealing face 126a, as indicated by the double-headed arrow M. Owing to this relationship, a sudden increase in pressure in the chambers 148 and 149 will squeeze the radially outer annular portions of the intermediate seal ring in a manner to close the bellows element 171 and to incline the seal face 126a so that its outer edge is separated from the rotary seal ring, all in a manner analogous to the action of the seal ring 22, as hereinbefore explained in connection with FIG. 5. This flexing, minute though it may be, allows fluid to rush past the sealing face 126a into the space between the intermediate and inner seal rings to rapidly establish equilibrium pressure therein. As in the case of the seal ring 22 of FIG. 5, the chamber 170 of the intermediate seal ring of FIG. 6 acquires an internal pressure depending upon the location of the hole 172, this intermediate pressure falling between the pressures on either side of the sealing face 126a.

From the foregoing description of the seal of FIG. 6, it is seen that the axially movable seal rings respond to changes in pressure drops across their respective sealing faces in a manner always to restore equilibrium operating conditions.

References herein to right and left-hand, top and bottom, or inner and outer directions have been for the purpose of facilitating the description, and are not intended in any way to limit the invention. Modifications of the seals shown herein by way of illustration will readily occur to those merely skilled in the mechanical seal art. For example, the stationary and rotary elements of the seals may be interchanged so that the concentric ring element rotates with the shaft and the single ring element is fixed to the housing. The seals of the invention may also be adapted to be placed outside of the housing instead of inside in a manner well understood in the mechanical seal art.

It will be apparent from the foregoing text read in connection with the drawings that the present invention provides self-adjusting mechanical seals having many advantages and fulfilling the objects of the invention.

I claim:
1. A self-adjusting mechanical seal comprising:
   (a) a rotary sealing element;
   (b) a fixed sealing element complementary thereto;
   (c) one of said elements having a plurality of concentric, axially movable, seal rings;
   (d) each said seal ring having an annular sealing face, the sealing faces of the rings being radially spaced from each other and being disposed in rotatable, sealing relation to an opposed sealing face of the other of said elements;
   (e) a plurality of axially extending bellows means disposed concentrically with said concentric rings, at least one of said bellows means being sealed to and between each adjacent pair of said concentric rings;
   (f) a case;
   (g) at least one of said bellows means being sealed between a portion of the radially innermost one of said concentric rings and said case; and
   (h) means responsive to differential pressures across said bellows means for urging each of said concentric rings axially towards said other sealing member.

2. A self-adjusting mechanical seal as defined in claim 1 wherein at least one of said concentric seal rings comprises means responsive to differential pressure across the ring for canting the sealing face of said ring with respect to the opposed sealing face of said other sealing element to permit fluid to flow more readily across said opposed sealing faces.

3. A self-adjusting mechanical seal as defined in claim 1 comprising means for distributing fluid between said rings and to the inner and outer faces of said bellows means to provide substantially equal pressure differentials across each of said bellows means.

4. A mechanical seal assembly for a partition member having a shaft opening and a shaft member in said opening, said members being rotatable relative to each other about the shaft axis, said partition member separating fluids of different pressures on opposite sides thereof, said mechanical seal assembly comprising:
   (a) a first sealing element mounted upon and sealed to one of said members;
   (b) a second sealing element complementary to said first sealing element and mounted upon the other of said members;
   (c) said first sealing element including a first seal ring concentric with said shaft and having a substantially radially extended, continuous, sealing face;
   (d) said second sealing element including a second ring concentric with said shaft, axially spaced from said first seal ring, and sealed to the said member upon which said second sealing element is mounted;
   (e) a plurality of seal rings, opposed to said first seal ring, said plurality of seal rings being disposed between said first seal ring and said second seal ring and being concentric with said shaft, the rings of said plurality of seal rings encircling one another progressively outwardly from the shaft and being radially spaced from the shaft and from each other;
   (f) each of said plurality of seal rings having a sealing face disposed in opposed, sealing relation to the sealing face of said first seal ring and being independently axially movable with respect to said first seal ring to vary the distance between opposed sealing faces of said seal rings;
   (g) the sealing faces of adjacent, axially movable, seal rings being radially spaced from each other to provide, with portions of said adjacent seal rings and portions of said first seal ring, annular spaces between adjacent seal rings;
   (h) a plurality of pressure-resistant, cylindrical, bellows units disposed coaxially with said axis, said bellows units extending between and sealed to adjacent, axially movable, rings, and extending between and sealed to one of said axially movable seal rings and said second ring, to define, with portions of said adjacent seal rings, and with portions of said second ring, a plurality of chambers;
   (i) the number of said bellows units in the space between said second ring and said one, axially movable, seal ring being equal to the number of said axially movable seal rings, and the number of said bellows units between each adjacent pair of axially movable seal rings being one fewer than the number of said bellows units between said adjacent pair of axially movable seal rings next nearer to said second ring;
   (j) fluid conduit means communicating each of said annular spaces with a corresponding one of said chambers between said one, axially movable, seal ring and said second ring through intermediate chambers to equalize fluid pressure differentials across each of the sealing faces of said axially movable seal rings with fluid pressure differentials across each corresponding bellows unit;
   (k) means communicating the radially outer periphery of the sealing face of the outermost one of said axially movable seal rings and radially outer surface area of the radially outermost of said bellows units with fluid on one side of said partition member; and
   (l) means communicating the radially inner periphery of the sealing face of the innermost one of said axially movable seal rings and the radially inner surface area of the radially innermost of said bellows units with fluid on the other side of said partition member.

5. A mechanical seal assembly as defined in claim 4 wherein the outer diameter of the sealing face of each said axially movable seal ring and the mean diameters of the said bellows unit associated with it are selected to provide an effective area against which differential pressure said bellows acts to set said sealing faces.

6. A mechanical seal assembly for a partition member having a shaft-opening and a shaft member in said opening, said members being rotatable relative to each other about the shaft axis, said partition member separating fluids of different pressures on opposite sides thereof, said mechanical seal assembly comprising:
   (a) a first sealing element mounted upon and sealed to one of said members;

(b) a second sealing element complementary to said first sealing element and mounted upon the other of said members;

(c) said first sealing element including a first seal ring having a substantially radially extended, continuous, sealing face;

(d) said second sealing element including second and third seal rings opposed to said first seal ring, and a fourth ring sealed to the said member upon which said second sealing element is mounted;

(e) said first, second and third seal rings and said fourth ring being disposed substantially coaxially with said axis;

(f) said second and third seal rings each having a sealing face disposed in opposed, sealing relation to the sealing face of said first seal ring;

(g) said second and third seal rings being independently, axially movable with respect to said first seal ring to vary the distance between opposed sealing faces of said seal rings;

(h) one of said second and third seal rings encircling the other;

(i) the sealing faces of said second and third seal rings being radially spaced from each other to provide an annular space with portions of said first, second and third seal rings;

(j) there being, in operation of the mechanical seal assembly, a fluid pressure differential across said sealing faces from the outer periphery of the sealing face of the outer one of said second and third seal rings to the inner periphery of the sealing face of the inner one of said second and third seal rings;

(k) a first, pressure-resistant, annular bellows disposed substantially coaxially with said axis and extending between and sealed to said second and third seal rings to define a first chamber with portions of said second and third seal rings;

(l) means placing the face of said bellows that is external to said chamber in fluid communication with fluid on the higher pressure periphery of said sealing faces;

(m) a second, pressure-resistant, annular bellows disposed substantially coaxially with said axis and extending between and sealed to said third seal ring and said fourth ring;

(n) means placing one face of said second bellows in fluid communication with fluid on the higher pressure periphery of said sealing faces;

(o) a third, pressure-resistant, annular bellows disposed opposite the other face of said second bellows and substantially coaxially with said axis, said third bellows extending between and sealed to said third seal ring and said fourth ring to define a second chamber with said second bellows and portion of said third seal ring and said fourth ring;

(p) first fluid conduit means communicating said first chamber with said anular space;

(q) second fluid conduit means communicating said first chamber with said second chamber; and (r) means placing the face of said third bellows that is external to said second chamber in fluid communication with fluid in the lower pressure periphery of said sealing faces.

7. A mechanical seal assembly for a pair of members relatively rotatable about an axis, a first sealing element mounted upon and sealed to one of said members, and a second sealing element complementary to said first sealing element and mounted upon the other of said members, said first sealing element including a first seal ring having a substantially radially extended sealing face, said second sealing element including second and third seal rings opposed to said first seal ring together with a fourth ring sealed to the said member upon which said second sealing element is mounted, said first, second and third seal rings and said fourth ring being disposed substantially coaxially with said axis, said first seal ring being substantially immovable in the axial direction, said second seal ring encircling said third seal ring, said second and third seal rings being independently movable in the axial direction and each having a sealing face disposed in sealing relation to the sealing face of said first seal ring, the sealing faces of said second and third seal rings being radially spaced from each other to provide an annular space therebetween, the outer periphery of the sealing face of said second seal ring being subject to the pressure of a high pressure fluid outside of said second seal ring, and the inner periphery of the sealing face of said third seal ring being subject to the pressure of a low pressure fluid inside of said third seal ring:

(a) a first, pressure-resistant, annular bellows disposed substantially coaxially with said axis and extending between and sealed to said second and third seal rings to define with said second and third seal rings a first chamber;

(b) a second, pressure-resistant, annular bellows disposed substantially coaxially with said axis and extending between and sealed to said third seal ring and said fourth ring;

(c) a third, pressure-resistant, annular bellows encircled by said second bellows, said third bellows disposed substantially coaxially with said axis and extending between and sealed to said third seal ring and said fourth seal ring to define a second chamber with said second bellows, said third seal ring, and said fourth ring;

(d) first fluid conduit means communicating said first chamber with the anular space between the sealing faces of said second and third seal rings;

(e) second fluid conduit means communicating said first chamber with said second chamber;

(f) means placing the sides of said first and second bellows that are external to said first and second chambers in fluid communication with said high pressure fluid; and (g) means placing the side of said third bellows that is external to said second chamber in fluid communication with said low pressure fluid.

8. A two-stage mechanical seal assembly for a partition having a shaft-opening and a shaft rotatable in said opening, said partition separating fluids of different pressures on opposite sides thereof, said mechanical seal assembly comprising:

(a) a rotary seal ring mountable upon and sealable to said shaft, said ring having a radially extended sealing face;

(b) a stationary case adapted to encircle said shaft and to be sealed to said partition;

(c) a first, non-rotary, independently axially movable, seal ring adapted to encircle said shaft and having a sealing face opposed to said radially extended face, the radially outer portion of said sealing face being exposable to fluid pressure on the higher pressure side of said partition;

(d) a second, non-rotary, independently axially movable, seal ring adapted to encircle said shaft and having a sealing face opposed to said radially extended face, said sealing face of said second, non-rotary, seal ring being spaced radially inward from said seal face of said first, non-rotary, seal ring;

(e) a first, pressure-resistant, bellows extending between and sealed to said first, non-rotary, seal ring and said second, non-rotary, seal ring to define with said, non-rotary rings a first chamber, the side of said bellows external to said chamber being exposable to fluid on the higher pressure side of said partition;

(f) fluid conduit means communicating said first chamber with the space between the sealing faces of said first and second, non-rotary, seal rings;

(g) a second, pressure-resistant, bellows extending between and sealed to said second, non-rotary, seal ring and said case;

(h) a third, pressure-resistant, bellows extending between and sealed to said second, non-rotary, seal ring and said case;

(i) said second, non-rotary, seal ring, said case, and said second and third bellows defining a second chamber;

(j) the side of said second bellows external to said second chamber being exposable to fluid on the higher pressure side of said partition;

(k) fluid conduit means communicating said second chamber with said first chamber; and (l) the radially inner portion of the sealing face of said second, non-rotary, seal ring and the side of said third bellows external to said second chamber being exposable to fluid on the lower pressure side of said portion.

9. A two-stage mechanical seal assembly for a partition having a shaft-opening and a shaft rotatable in said said opening, said partition separating fluids of different pressures on opposite sides thereof, said mechanical seal assembly comprising:

(a) a rotary seal ring mountable upon and sealable to said shaft, said ring having a radially extended sealing face;

(b) a stationary, cylindrical, case adapted to encircle said shaft and to be sealed to said partition on the higher fluid pressure side thereof, said case having a radial end wall portion providing a shaft-opening adapted to be spaced from said shaft, said case having an axial side wall portion extending from said end wall portion coaxially of said shaft, said case having an open end opposite said end wall portion;

(c) a first, non-rotary, independently axially movable, seal ring in the open end of said case, said ring being adapted to encircle said shaft and having a sealing face opposed to said radially extended face, the radially outer portion of said sealing face being exposable to fluid pressure on the higher pressure side of said partition;

(d) a second, non-rotary, independently axially movable, seal ring adapted to encircle said shaft, said second, non-rotary, seal ring having an axial portion extending within and spaced from said first, non-rotary, seal ring, and a radial portion extending between and spaced from said first, non-rotary, seal ring and said end wall portion of said case, the axially extending portion of said second, non-rotary seal ring having a sealing face opposed to said radially extended face and spaced radially inward from said seal face of said first, non-rotary, seal ring;

(e) a first, pressure-resistant, cylindrical bellows extending between and sealed to said first, non-rotary, seal ring and said radial portion of said second, non-rotary, seal ring to define with said non-rotary rings a first chamber communicating with the space between the sealing faces of said non-rotary rings through the space between said first, non-rotary, seal ring and the axial portion of said second, non-rotary seal ring;

(f) a second, pressure-resistant, cylindrical bellows extending between and sealed to the radial portion of said second, non-rotary, seal ring and the radial end wall portion of said case;

(g) a third, pressure-resistant, cylindrical bellows positioned radially inward of said second bellows and radially outward from said shaft, said third bellows extending between and sealed to the radial portion of said second, non-rotary, ring and the radial end wall portion of said case to define a second chamber with said second bellows, the radial portion of said second, non-rotary, ring and the radial end wall portion of said case;

(h) fluid conduit means communicating said second chamber with said first chamber;

(i) said case providing ports for exposing the radially outer sides of said first and second bellows to fluid pressure on the higher pressure side of said partition; and (j) the radially inner portion of the sealing face of said second, non-rotary, seal ring being exposable to fluid pressure on the lower pressure side of said partition through the space between the axial portion of said second, non-rotary, seal ring, the space between said third bellows and said shaft, and the shaft-opening the radial end wall portion of said case.

10. A two-stage mechanical seal assembly as defined in claim 9 wherein said first, non-rotary, seal ring has its seal face disposed radially inwardly from its outer periphery and said first bellows is sealed to said first ring radially inwardly from its outer periphery to provide a peripheral ring portion extending radially outwardly from said seal face and said bellows, said ring providing an annular groove extending from its periphery radially inward beyond the outer peripheries of the seal face of said first seal ring and said first bellows, bellows means closing the peripheral opening of said groove, and conduit means communicating the interior of said groove with the seal face of said first seal ring, whereby sudden increase of pressure of fluid outside said first seal ring is exerted on the sides of said peripheral ring portion to flex said sides towards each other to incline the sealing face of said first seal ring away from the radially extended sealing face of said rotary seal ring and permit said fluid to flow quickly into said first chamber and into the interior of said groove, tending to equalize the pressures inside said groove and outside said first seal ring and unflex the sides of said peripheral ring portion to restore the sealing face of said first, non-rotary, seal ring towards its normal position with respect to the radially extended sealing face of said rotary seal ring.

11. A three-stage mechanical seal assembly for a partition having a shaft-opening and a shaft rotatable in said opening, said partition separating fluids of different pressures on opposite sides thereof, said mechanical seal assembly comprising:

(a) a rotary seal ring mountable upon and sealable to said shaft, said ring having a radially extended sealing face;

(b) a stationary, cylindrical case adapted to encircle said shaft and to be sealed to said partition on the higher fluid pressure side thereof, said case having a radial end wall portion providing a shaft-opening adapted to be spaced from said shaft, said case having an axial side wall portion extending from said wall portion coaxially of said shaft, said case having an open end opposite said end wall portion;

(c) a first, non-rotary, independently axially movable, seal ring in the open end of said case, said ring being adapted to encircle said shaft and having a sealing face opposed to said radially extended face, the radially outer portion of said sealing face being exposable to fluid pressure on the higher pressure side of said partition;

(d) a second, non-rotary, independently axially movable, seal ring adapted to encircle said shaft, said second, non-rotary, seal ring having an axial portion extending within and spaced from said first, non-rotary, seal ring, and a radial portion extending parallel to and spaced from said first, non-rotary, seal ring on the side of the latter away from said rotary seal ring, the axially extending portion of said second, non-rotary, seal ring having a sealing face opposed to said radially extended face and spaced radially inward from said seal face of said first, non-rotary, seal ring;

(e) a third, non-rotary, independently axially movable, seal ring adapted to encircle said shaft, said third, non-rotary, seal ring having an axial portion extending within and spaced from the axial portion of said second, non-rotary, seal ring and spaceable from said shaft, and a radial portion extending between and spaced from the radial portion of said second, non-rotary, seal ring and said end wall portion of said case, the axially extending portion of said third, non-rotary, seal ring having a sealing face opposed to said radially extended face and spaced radially inward from said seal face of said second, non-rotary, seal ring;

(f) a first, pressure-resistant, cylindrical bellows extending between and sealed to said first, non-rotary, seal ring and said radial portion of said second, non-rotary, seal ring to define with said first and second, non-rotary, seal rings a first chamber communicating with the space between the sealing faces of said first and second, non-rotary, seal rings through the space between said first, non-rotary, seal ring and the axial portion of said second, non-rotary, seal ring;

(g) a second, pressure-resistant, cylindrical bellows extending between and sealed to the radial portions of said first and second, non-rotary, seal rings;

(h) a third, pressure-resistant, cylindrical bellows positioned radially inward from said second bellows and extending between and sealed to the radial portions of said first and second, non-rotary, seal rings to define a second chamber with said second bellows and the radial portions of said first and second, non-rotary, seal rings, and to further define a third chamber with the radial portions of said first and second, non-rotary, seal rings and the axial portion of said third, non-rotary, seal ring, said third chamber communicating with the space between the sealing faces of said second and third, non-rotary, seal rings through the space between the axially extending portions of said second and third, non-rotary, seal rings;

(i) first fluid conduit means communicating said second chamber with said first chamber;

(j) a fourth, pressure-resistant, cylindrical bellows extending between said sealed to the radial portion of said third, non-rotary, seal ring and the radial end wall portion of said case;

(k) a fifth, pressure-resistance, cylindrical bellows positioned radially inward from said fourth bellows and extending between and sealed to the radial portion of said third, non-rotary, seal ring and the radial end wall portion of said case to define a fourth chamber with said fourth bellows, the radial portion of said third, non-rotary, seal ring, and the radial end wall portion of said case;

(l) second fluid conduit means communicating said fourth chamber with said second chamber;

(m) a sixth, pressure-resistant, cylindrical bellows positioned radially inward from said fifth bellows and radially outward from said shaft, said sixth bellows extending between and sealed to the radial portion of said third, non-rotary, seal ring and the radial end wall portion of said case to define a fifth chamber with said fifth bellows, the radial portion of said third, non-rotary, seal ring, and the radial end wall portion of said case;

(n) third fluid conduit means communicating said fifth chamber with said third chamber;

(o) said case providing ports for exposing the radially outer sides of said first, second and fourth bellows to fluid pressure on the higher pressure side of said partition; and (p) the radially inner portion of the sealing face of said third, non-rotary, seal ring being exposable to fluid pressure on the lower pressure side of said partition through the space between the axial portion of said third, non-rotary, seal ring, the space between said sixth bellows and said shaft, and the shaft-opening in the radial end wall portion of said case.

References Cited by the Examiner

UNITED STATES PATENTS

| | | | |
|---|---|---|---|
| 2,928,685 | 3/1960 | Tracy | 277—74 X |
| 2,930,636 | 3/1960 | Tracy | 277—27 |
| 3,085,808 | 4/1963 | Williams | 277—27 X |
| 3,141,677 | 7/1964 | Williams | 277—27 X |

SAMUEL ROTHBERG, *Primary Examiner.*

UNITED STATES PATENT OFFICE

CERTIFICATE OF CORRECTION

Patent No. 3,318,604                                          May 9, 1967

Herbert E. Tracy

It is hereby certified that error appears in the above numbered patent requiring correction and that the said Letters Patent should read as corrected below.

Column 15, lines 27, 31, 33 and 35, for "first and second", each occurrence, read -- second and third --.

Signed and sealed this 14th day of January 1969.

(SEAL)
Attest:

Edward M. Fletcher, Jr.                                EDWARD J. BRENNER

Attesting Officer                                                   Commissioner of Patents